(12) United States Patent
Jennings

(10) Patent No.: US 8,215,336 B2
(45) Date of Patent: Jul. 10, 2012

(54) FLUID BALANCING RELIEF VALVE WITH GROOVED PROCESS SURFACE

(76) Inventor: Jeffrey D. Jennings, Hendersonville, NC (US)

( * ) Notice: Subject to any disclaimer, the term of this patent is extended or adjusted under 35 U.S.C. 154(b) by 462 days.

(21) Appl. No.: 12/479,575

(22) Filed: Jun. 5, 2009

(65) Prior Publication Data

US 2009/0242045 A1    Oct. 1, 2009

Related U.S. Application Data

(63) Continuation-in-part of application No. 11/459,816, filed on Jul. 25, 2006, now Pat. No. 7,673,650, which is a continuation-in-part of application No. 11/093,071, filed on Mar. 29, 2005, now Pat. No. 7,080,660, which is a continuation of application No. 10/122,673, filed on Apr. 15, 2002, now Pat. No. 6,886,591.

(60) Provisional application No. 61/059,261, filed on Jun. 5, 2008.

(51) Int. Cl.
F16K 15/00 (2006.01)
(52) U.S. Cl. .................................. 137/529; 137/512.15
(58) Field of Classification Search .................. 137/511, 137/512.1, 512.15, 529
See application file for complete search history.

(56) References Cited

U.S. PATENT DOCUMENTS

| | | | |
|---|---|---|---|
| 2,563,665 A | 8/1951 | Thomas | |
| 2,986,881 A | 6/1961 | Moore | |
| 3,642,026 A | 2/1972 | Sielaff | |
| 3,768,279 A | 10/1973 | Butler | |
| 4,205,637 A | 6/1980 | Ito et al. | |
| 4,375,824 A | 3/1983 | von Borries et al. | |
| 4,615,320 A | 10/1986 | Fehrenbach et al. | |
| 4,625,759 A | 12/1986 | Craig | |
| 4,679,421 A | 7/1987 | Barree | |
| 4,712,580 A | 12/1987 | Gilman et al. | |
| 4,846,215 A | 7/1989 | Barree | |
| 4,903,721 A | 2/1990 | Maier | |
| 4,960,740 A | 10/1990 | House et al. | |
| 4,981,157 A | 1/1991 | Denkinger | |
| 5,265,645 A | 11/1993 | Goodwin | |
| 5,520,215 A | 5/1996 | Haboush | |
| 5,944,050 A | 8/1999 | Walker | |
| 5,967,120 A | 10/1999 | Blanton et al. | |
| 6,095,183 A | 8/2000 | Taylor et al. | |
| 6,318,406 B1 | 11/2001 | Conley | |
| 6,848,471 B2 * | 2/2005 | Floh et al. ................ | 137/512.15 |
| 6,886,591 B2 | 5/2005 | Jennings | |
| 7,080,660 B2 | 7/2006 | Jennings | |
| 7,673,650 B2 | 3/2010 | Jennings | |

OTHER PUBLICATIONS

Insight Process Solutions, drawings of pressure regulator offered for sale prior to Jul. 25, 2005 (6 sheets).

* cited by examiner

*Primary Examiner* — John Fristoe, Jr.
(74) *Attorney, Agent, or Firm* — Trego, Hines & Landenheim, PLLC

(57) ABSTRACT

A valve includes: a body including: a wall defining a process surface, a process void in the process surface adapted to communicate with fluid at process pressure, and at least two vent voids in the wall separate from the process void; an inlet port in fluid communication with the process void; and an outlet port in fluid communication with the vent void; a reference housing adapted to communicate with fluid at reference pressure; and a membrane constrained between the body and the reference housing with its process side substantially coplanar with the process surface. The process surface incorporates at least one groove therein which defines a flow path between the near vicinity of the process void and the near vicinity of the vent voids.

12 Claims, 14 Drawing Sheets

FLUID BALANCING RELIEF VALVE WITH GROOVED PROCESS SURFACE

CROSS-REFERENCE TO RELATED APPLICATIONS

This application is a Continuation-in-Part of U.S. application Ser. No. 11/459,816 filed on Jul. 25, 2006, which is a Continuation-in-Part of U.S. application Ser. No. 11/093,071, now U.S. Pat. No. 7,080,660, which is a Continuation of application Ser. No. 10/122,673, now U.S. Pat. No. 6,886,591. This application claims the benefit of Provisional Patent Application No. 61/059,261 Filed on Jun. 5, 2008.

BACKGROUND OF THE INVENTION

The present invention relates to pressure regulation, and more particularly to a diaphragm-type valve which balances a process pressure against a reference pressure signal.

There are many applications which require a highly precise modulated pressure relief valve for venting fluid when the pressure exceeds a desired dynamic set-point or threshold. An example of a precision valve suitable for such applications is described in U.S. Pat. No. 6,886,591 to Jennings. The '591 patent describes a floating diaphragm relief device which balances vessel, or line pressure, against a reference pressure signal. A simple flexible diaphragm constrained on its periphery separates the reference fluid chamber on one side from a specific seating surface on the other side. This seating surface contains a connection to both the vessel, line or upstream process and vent or downstream environment. The seating surface contains vent holes of varying sizes which, when the diaphragm is not fully seated against them, can communicate from the vessel or line to the vent or lower pressure environment.

Although the valve described in the '591 patent does provide unprecedented performance compared to other forms of back pressure regulation, it is difficult to identify a seat geometry which provides very high performance at both high flow rates and a combination of low flow/low pressure applications.

A coplanar diaphragm constraint is important for low pressures and low flow rates. When the diaphragm constraint surface is coplanar with the plane of vent voids (process surface), this is the lowest stress position for the diaphragm, and also the position with the least chance of wrinkles. The coplanar configuration gives the lowest error for low flow and low pressure applications. However, for many higher flow rate and higher pressure applications, the most optimum design uses a diaphragm constraint which is slightly higher than the plane of the process surface.

Unfortunately, in these existing designs is the seat geometry must be a compromise between the lower pressure and the higher flow rate designs.

BRIEF SUMMARY OF THE INVENTION

These and other shortcomings of the prior art are addressed by the present invention, which provides a diaphragm-type pressure regulating valve incorporating a grooved process surface suitable for both high and low flow regimes.

According to one aspect of the invention, a pressure regulating valve includes: (a) a body including: (i) a wall with a first side which defines a process surface, at least one process void disposed in the process surface and adapted to be disposed in fluid communication with a fluid at a process pressure, and at least two vent voids disposed in the wall separate from the process void; (ii) an inlet port disposed in fluid communication with the at least one process void; and (iii) an outlet port disposed in fluid communication with the at least one vent void, (b) a reference housing adapted to be disposed in fluid communication with a fluid at a predetermined reference pressure; and (c) a membrane having opposed reference and process sides, the membrane constrained between the body and the reference housing such that the process side is substantially coplanar with the process surface, and arranged such that, when the reference pressure is higher than the process pressure the membrane is engaged with the vent void, and when the process pressure is higher than the reference pressure, the membrane is not engaged with the vent void; (d) wherein the process surface incorporates at least one groove therein which defines a flow path between the near vicinity of the process void and the near vicinity of the vent voids.

According to another aspect of the invention, a pressure regulating valve includes: (a) a body including: (i) a wall with a first side which defines a generally planar process surface, at least one process void disposed in the process surface and adapted to be disposed in fluid communication with a fluid at a process pressure, and a plurality of vent voids disposed in the wall separate from the process void; (ii) an inlet port disposed in fluid communication with the at least one process void; and (iii) an outlet port disposed in fluid communication with the at least one vent void, (b) a reference housing adapted to be disposed in fluid communication with a fluid at a predetermined reference pressure; and (c) a membrane having opposed reference and process sides, the membrane constrained between the body and the reference housing, and arranged such that, when the reference pressure is higher than the process pressure the membrane is engaged with the vent void, and when the process pressure is higher than the reference pressure, the membrane is not engaged with the vent void; (d) wherein the process surface incorporates a raised surface surrounding each of the vent voids, such that spaces present between the raised surfaces define a flow path between the near vicinity of the process void and the near vicinity of the vent void.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
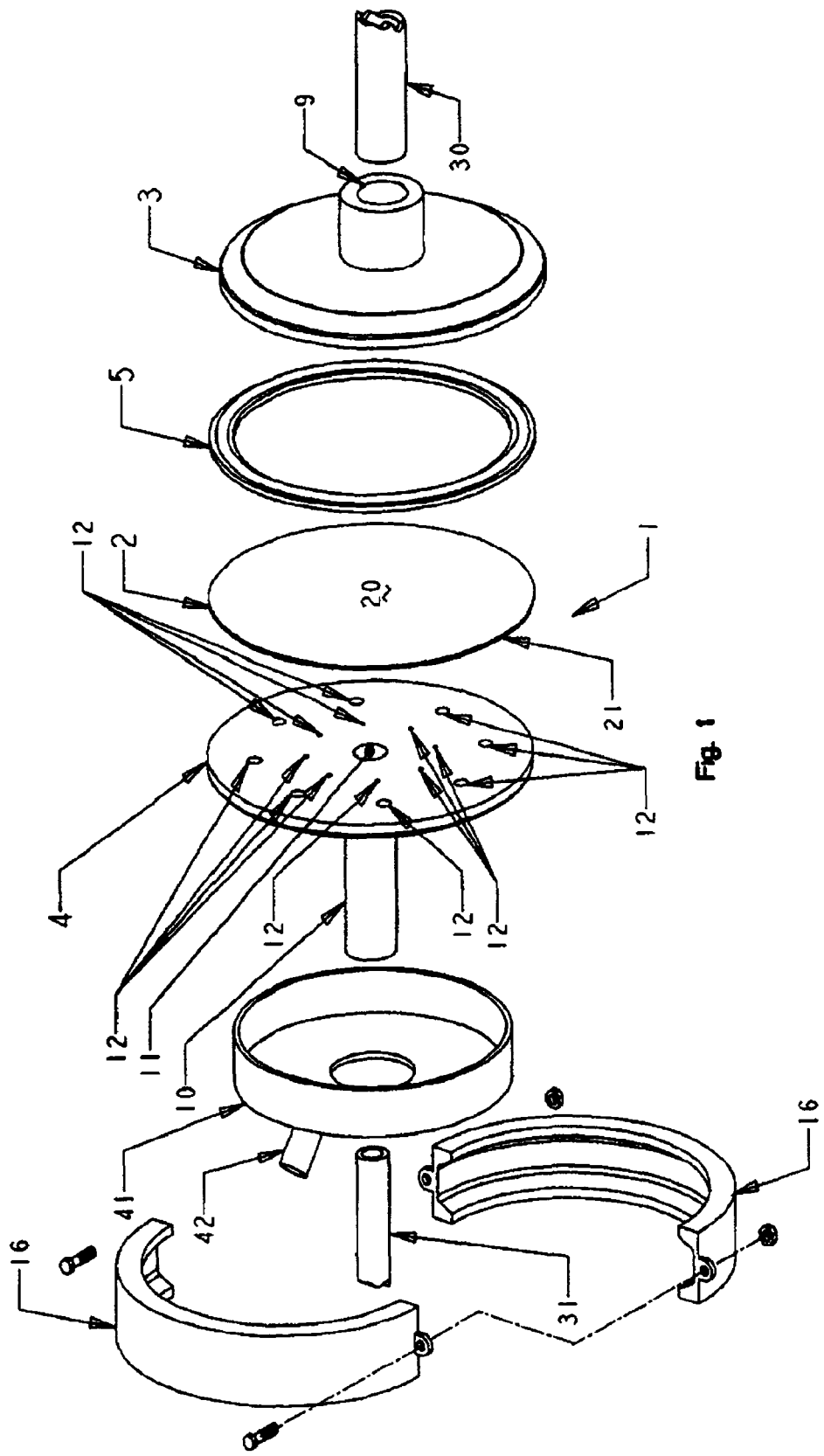
FIG. 1 is an exploded perspective view of a valve constructed according to an aspect of the present invention.

Referring to the drawings wherein identical reference numerals denote the same elements throughout the various views, FIG. 1 depicts an exemplary modulated pressure relief valve, generally represented at 1, in exploded perspective view. The modulated pressure relief valve 1 comprises a diaphragm 2, which is enclosed between a reference housing 3 and a process housing 4. The diaphragm 2 comprises a reference surface 20 and a process surface 21 which is opposite the reference surface. For the purposes of the present application the volume between the reference surface 20 of the diaphragm 2 and reference housing 3 is referred to as the reference volume and the area between the process surface 21 of the diaphragm 2 and the process housing 4 is referred to as the process volume. An optional seal 5, can be employed between the diaphragm 2 and reference housing 3, between the diaphragm 2 and process housing 4, or both to insure that the entire assembly is sealed relative to operating pressure ranges which are anticipated.

The reference housing 3 comprises a reference coupling, 9, which engages with a reference pressure source 30. The reference coupling 9 can be any coupling typically employed for connecting a fluid source to a device. Threaded couplings, compression couplings, ferruled couplings, soldered couplings, welded couplings, barbed couplings attached to flexible tubing and the like are imminently suitable for the demonstration of the invention. It would be well within the ability of one skilled in the art to attach a pressure system to a coupling and further description herein is not warranted.

The process housing 4 comprises a process coupling, 10, which attaches to a process system 31, within which the pressure is to be maintained. The process coupling 10 can be any coupling typically employed for connecting a pressure regulator, or pressure release to a process vessel or line. Threaded couplings, compression couplings, ferruled couplings, soldered couplings, welded couplings, barbed couplings attached to flexible tubing and the like are imminently suitable for the demonstration of the invention. It would be well within the ability of one skilled in the art to attach a process system to a coupling and further description herein is not warranted.

The process housing 4 comprises a process void, 11, which is in pressure communication with the process vessel such that the pressure at the process void is proportional to the pressure in the process vessel. In a particularly preferred embodiment the pressure at the process void is approximately equal to the pressure in the process vessel. In another embodiment the pressure at the process void is proportional to the pressure in the process vessel as would be realized when pressure reduction devices are utilized between the process vessel and modulated pressure relief valve as known in the art. At least one vent void, 12, is provided in the process housing, 4. The vent void, 12, is in flow communication with the environment exterior to the process vessel. As will be more fully understood from further descriptions when the pressure exerted on the reference surface of the diaphragm exceeds the pressure on the process surface of the diaphragm at the process void 11, the process void and vent voids are engaged by the diaphragm thereby sealing the vent void and prohibiting material, or the pressure created by material, from passing through the vent void. When the pressure in the process void, 11, is sufficient to dislodge the diaphragm from sealing engagement with the process void the diaphragm is persuaded towards the reference housing thereby disengaging the diaphragm from at least one vent void thereby forming a flow channel from the process void to the vent void whereby the pressure is released through the vent void.

Figure 2:
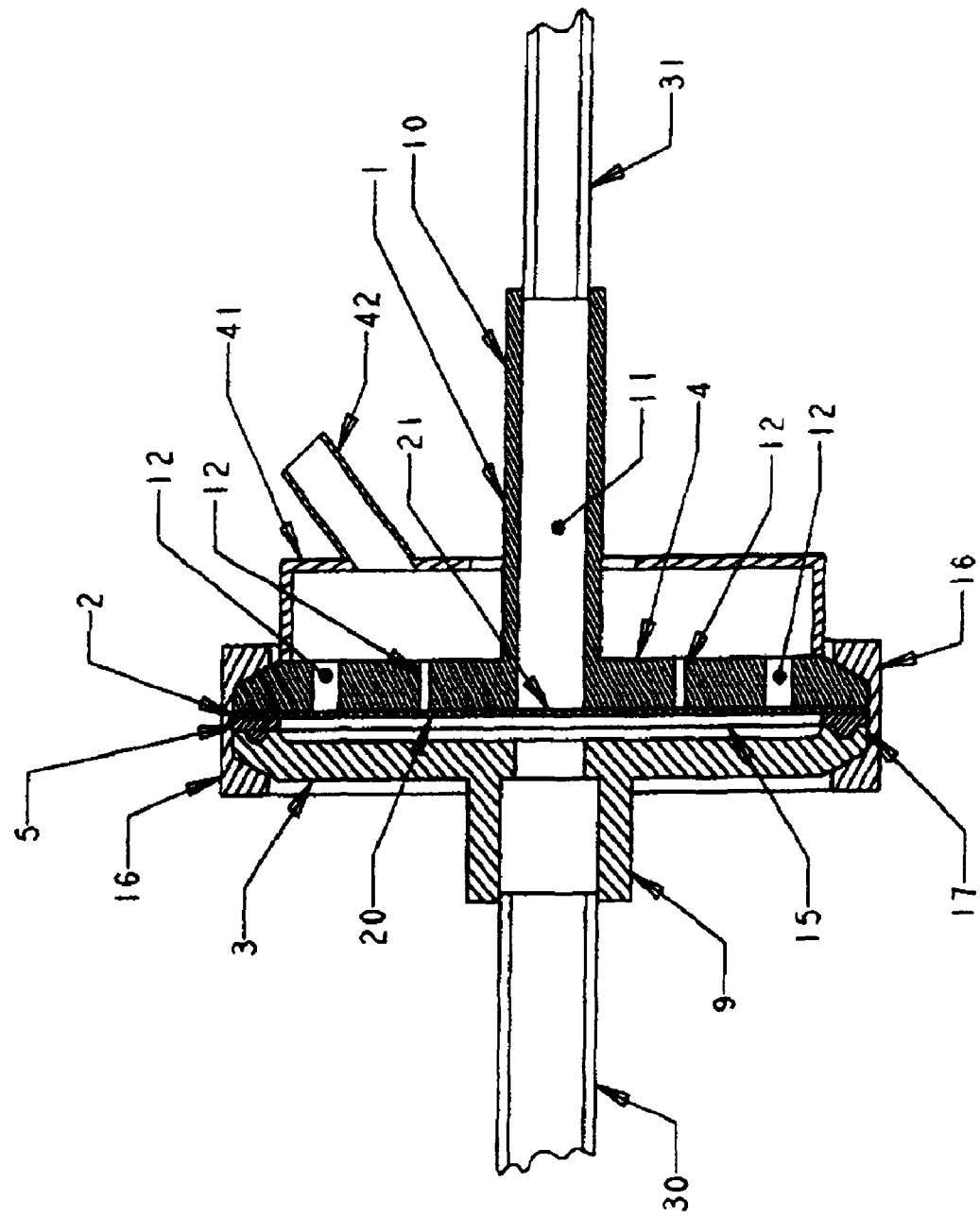
FIG. 2 is a cross-sectional view of a valve constructed to an aspect of the present invention.

A cross-sectional view of the modulated pressure relief valve is shown in FIG. 2 as it would appear when the pressure on the reference surface, 20, of the diaphragm, 2, exceeds the pressure on the process surface, 21, of the diaphragm. In this condition the reference volume, 15, is maximized and the process volume is essentially non-existent. As the pressure exerted on the area of the process surface, 21, increases due to an increase in pressure in the process coupling, 10, the diaphragm is persuaded away from the process housing thereby distorting the diaphragm. If the pressure on the process surface, 21, increases the process volume enlarges at the expense of the reference volume. As the process volume increases the diaphragm continues to be distorted until the diaphragm disengages with at least one vent void, 12, at which point the pressure is released through the vent void thereby allowing pressure to lower until the pressure is reduced to a pressure equal to the pressure in the reference volume at which point the process volume decreases and the diaphragm reengages with the vent void. It would be apparent from the description that the higher the pressure difference between the vessel and the reference coupling the more distorted the diaphragm becomes and therefore the diaphragm disengages with more vent voids.

An optional vent hood, 41, is provided whereby all material transiting through the vent void is captured and collected through a vent port, 42. It would be readily apparent that each vent void may have a separate vent port attached thereto. The vent ports allow the vented material to be captured and released as appropriate. A clamping mechanism, 16, with a receiving inset, 17, is provided in FIG. 2 wherein the modulated pressure relief valve is received in the inset, 17, to maintain the reference housing and process housing in sandwiched relationship with the diaphragm there between. The clamping mechanism could be a clamp, matching tabs, pliable ring seal or any mechanism capable of maintaining the modulated pressure relief valve in sandwiched relationship. It is well within the ability of one skilled in the art to utilize clamping mechanisms suitable for the application which would maintain the modulated pressure relief valve in the appropriate sandwiched relationship.

Figure 3:
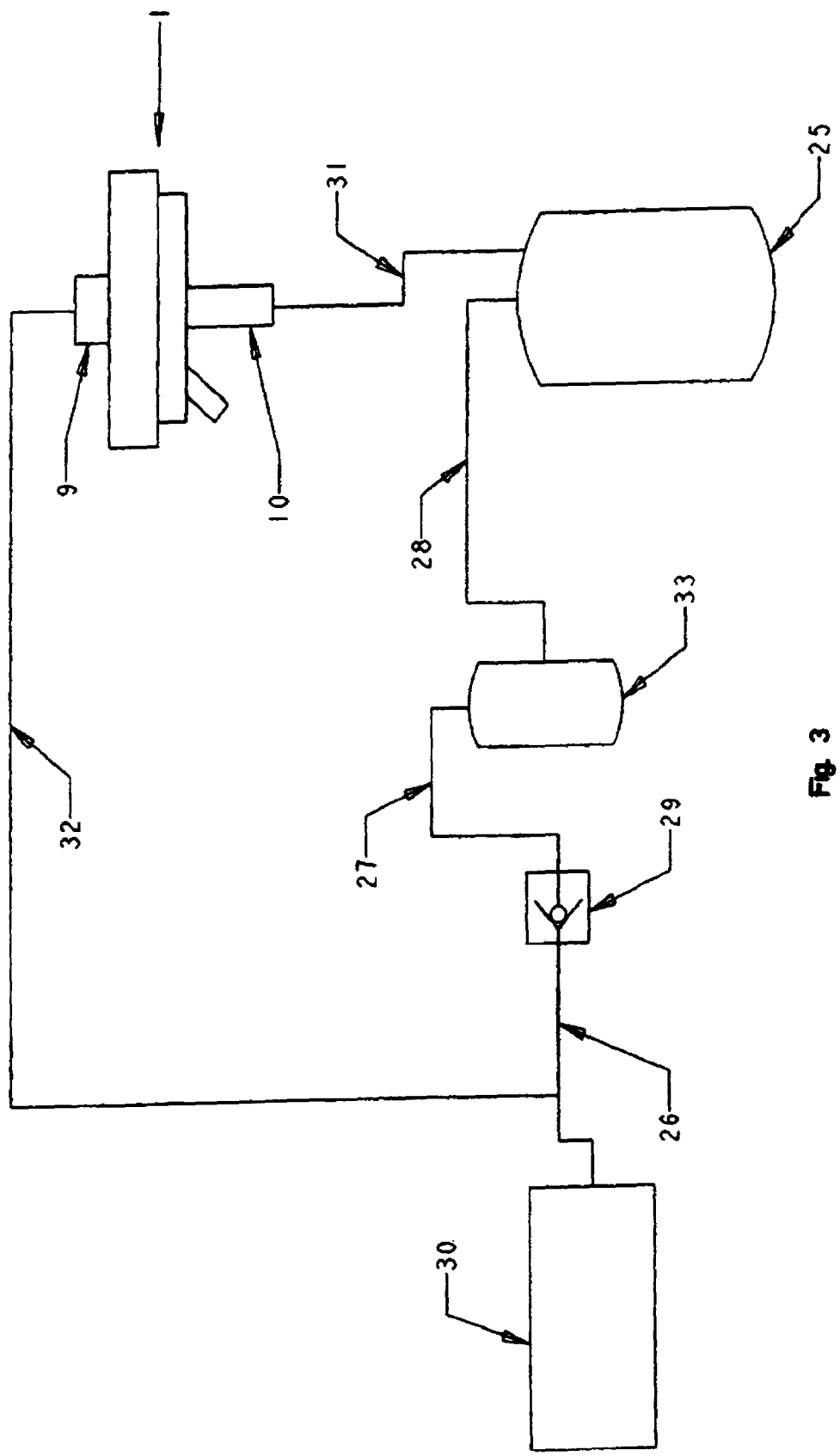
FIG. 3 is a schematic representation of a system incorporating a valve constructed according to an aspect of the present invention.

A schematic representation of a process system incorporating the modulated pressure relief valve is provided in FIG. 3. In FIG. 3, the modulated pressure relief valve, 1, is integral to a pressure control system which includes a process vessel, 25, and pressure reference source, 30. The process vessel, 25, is connected to the process coupling, 10, of the modulated pressure relief valve, 1, by a process line, 31, as would be readily understood to one of ordinary skill in the art. The reference coupling, 9, of the modulated pressure relief valve, 1, is connected to the reference pressure source, 30, by a process line, 32, as would be readily understood to one of ordinary skill in the art to form a control loop. An optional, but preferred, feed back loop, comprising a check valve, 29, and optional separator, 31, provides optimal control of the pressure within the process vessel. The check valve, 29, is preferably a one-way flow valve allowing flow towards the direction of the process vessel but not counter thereto. The process vessel, 25, separator, 33, check valve, 29, and reference pressure source, 30, are connected, preferably in series, by process lines, 28, 27, and 26 respectively. The pressure in the process vessel is maintained by venting through the modulated pressure relief valve, 1, or by replenishment through the check valve, 29. The system allows for accurate, rapid pressure control in the process vessel. By way of example, if the operator desires to increase the pressure in the process vessel the pressure from the reference pressure source is increased. The pressure above the diaphragm would then be increased and the air (or other fluid) would flow through the check valve. Once the pressure in the process vessel equals the pressure supplied by the reference pressure source the check valve and modulated pressure relief valve are both closed thereby the system pressure is neutral. It would be apparent that, in typical manufacturing configurations, there is a possible pressure drop in the lines leading to the vessel. This pressure drop may be more than the corresponding pressure drop in the lines leading to the modulated pressure relief valve. This is advantageous for the present invention but not required. If the operator desires to lower the pressure in the process vessel the pressure supplied by the reference pressure source is decreased. The pressure exerted on the diaphragm will then be lower on the reference face of the diaphragm and the process pressure will be allowed to vent until the pressure on each side of the diaphragm is rebalanced.

It is well known in the art that many control systems, particularly flow based control systems, do not adjust to a given level but instead typically go beyond the intended control level and then correct. This oscillatory approach is mitigated by the present invention which represents a particular advantage. Due to the ability of the modulated pressure relief valve to rapidly vent a system, as illustrated in FIG. 3, it balances the pressure introduction sufficiently to minimize the build up of pressure above the desired pressure.

The knowledge provided herein and understanding related to selection and location of the diaphragm, in conjunction with the placement, size, and shape of the vent voids, give the device a characterized performance curve. In practice, the valve can modulate between the closed state and cracked state, wherein venting occurs, with pressure differentials below ¼ psi.

A diaphragm is situated across a surface containing both the process void, from vessel or line, and a variety of smaller vent voids. On the reference surface of the diaphragm, the pressure reference fluid, preferably air, provides balancing forces. The sensitivity of the device is provided by the size of the vent voids from which the diaphragm is easily dislodged by low pressure differences. Greater relief volume is provided by progressively larger vent voids. The distance between the diaphragm and the interior surface of the reference housing, which determines the reference volume, is a critical parameter in predicting and controlling the sensitivity of the device.

The characteristics of the diaphragm are integral to the performance of the device. Excellent sensitivity has been achieved with a flexible diaphragm with reinforcement fibers to prevent excessive stretching.

There are three fluid pressures acting on the diaphragm, process pressure, vent pressure, and reference pressure. The diaphragm serves to balance the process pressure and reference pressure.

During normal balanced or modulating mode the diaphragm is drawn into a sealing relationship with the vent voids due to the pressure differential between the vent pressure and reference pressure. When the vessel pressure exceeds the reference pressure the area of the diaphragm between the vent voids is persuaded away from the outlet holes thereby allowing venting. This motion, however, is limited by the pressure exerted on the inner surface of the reference housing. The diaphragm is forced into an irregular pattern, with regions closely surrounding the vent voids being unsupported by the interior surface of the reference housing, and therefore trying to pull the diaphragm out of contact with the outlet hole. At the smallest holes, the ratio of unsupported diaphragm area to outlet hole area can be very high, such as 400:1 for example. When the ratio of pressure differential ratio, which is defined as the differential Vessel-Reference divided by Reference-Vent, rises to the area ratio, which is defined by the unsupported diaphragm area divided by the area of the vent void, then that particular vent void begins to crack open or modulate. The valve preferably opens up the smaller vent voids first, and gradually progresses to the larger vent voids. At higher differential pressures, such as several psi, the entire hole pattern opens up to allow higher venting volumes.

The selection of hole size and spacing controls the relieving capacity and the sensitivity of the device. The desired combination of high relieving capacity and high sensitivity can be achieved by combining both small holes and large holes in the same device. The smaller the size of the smallest vent voids, the greater the sensitivity of the device. In one embodiment a device with a minimum vent void diameter of 0.042", would yield a cracking sensitivity of approximately ¼ psi. Smaller vent voids would be expected to provide more sensitivity. In one embodiment the vent void is a frit with multiple flow paths through a given vent void. The vent voids are preferably large enough to avoid pluggage by contaminants in the fluid stream, and small enough to provide the required cracking sensitivity.

The number of small vent voids determines the relieving capacity of the device in the lower pressure differential range. While one very small vent void would provide a sensitive device that cracks at very low pressure differentials, it might not produce the needed effect on the system because the relieving volume of that hole might not be enough to control the system pressure. Therefore, a number of small vent voids may be provided such that the sum of their cross sectional area relates, proportionally, to the expected required relieving capacity. A vent void housing comprising 8 small holes, symmetrically arranged, is suitable for demonstration of the present invention.

Larger vent voids contribute to higher relieving capacity at the higher differential pressures. The ultimate relief capacity will be proportional to the sum total of all vent void cross sectional areas. Depending on the overall space available, a large hole size should be selected which provides enough capacity per hole for the process conditions without being so large as to have inadequate sensitivity. The diameter of the larger holes determines the differential pressures at which the higher relief flows can occur. Larger vent voids of approximately 0.15" diameter, would be expected to begin cracking open in the range of a few psi.

The minimum and maximum vent void sizes are based on the desired sensitivity of the valve in the low and high flow regimes and the contaminant characteristics of the fluid. Intermediate vent void sizes may be selected to assure good relieving capacity in the medium differential pressure range. The number of vent voids should be selected to achieve the desired maximum flow capacity. The full open flow of the valve can be approximated by analyzing the parallel transmittance provided by the parallel outlet vent voids. Diaphragm size, typically defined by the diameter, is preferably selected to allow for a reasonable spacing ratio between vent voids which is based, in part, on diaphragm movement gap or the maximum distance between the reference surface and interior of the reference housing.

The size of the process void is not a critical design parameter, but is preferably sized so that both the cross sectional area of the process void, and the cylindrical opening area between the process void and the retracted diaphragm (periphery multiplied by diaphragm movement gap) are both significantly larger than the sum total cross sectional area of all the vent voids.

The diaphragm movement gap, or the maximum distance between the reference surface, 20, and the reference housing, is a critical parameter. It affects the valve sensitivity and affects the optimum spacing of the vent void. The gap is preferably great enough that the cylindrical opening area (defined above), when the diaphragm is fully retracted against the reference housing, is larger than the sum total of the vent voids. A total diaphragm movement gap of 0.1" is suitable for demonstration of the invention.

Each vent void must have an adequate free area around it so that the diaphragm can form a dimple shaped unsupported area. The size of this spacing is related both to the vent void size and the gap distance that the diaphragm can move (distance between seat surface to reference housing surface). Increased vent void spacing tends to increase sensitivity up to a threshold ratio, and has less impact above that threshold ratio. A minimum hole spacing of 0.4 inches is adequate for demonstration of the present invention where the free diaphragm diameter is approximately 3 inches. The diaphragm movement gap of approximately 0.1 inch results in a vent void spacing to movement gap ratio of approximately 4:1.

The location of the vent voids is not a critical design parameter, assuming adequate spacing is provided. Good performance has been observed when the vent voids may be all of the same size. However, if varying vent void sizes are used, it is recommended that the smaller vent voids be located closer to the process void.

Figure 4:
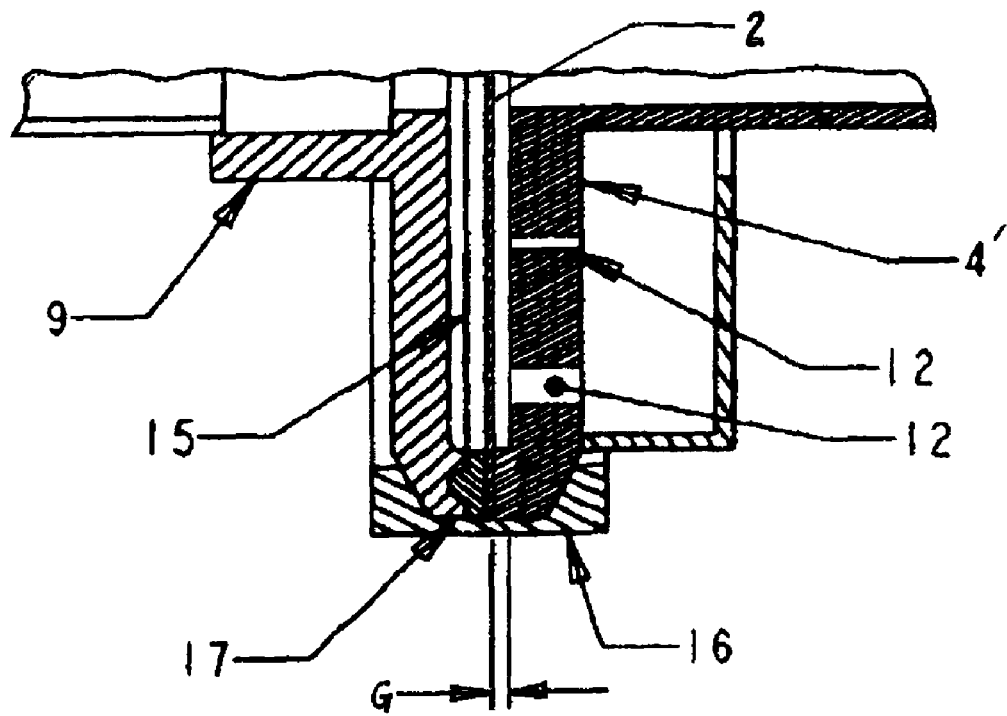
FIG. 4 is a partial cross-sectional view of an alternative method of mounting a diaphragm.
Figure 5:
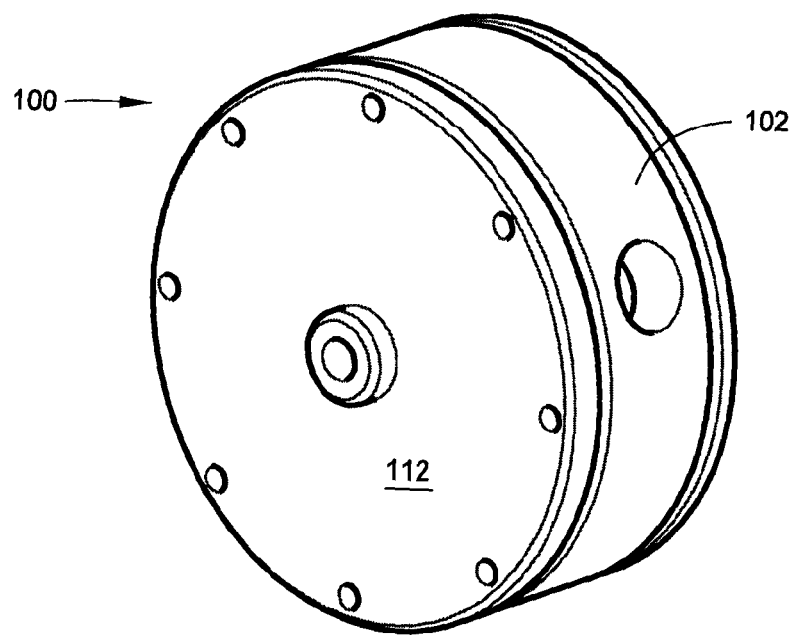
FIG. 5 is a top perspective view of a pressure regulating valve constructed according to an aspect of the invention.
Figure 6:
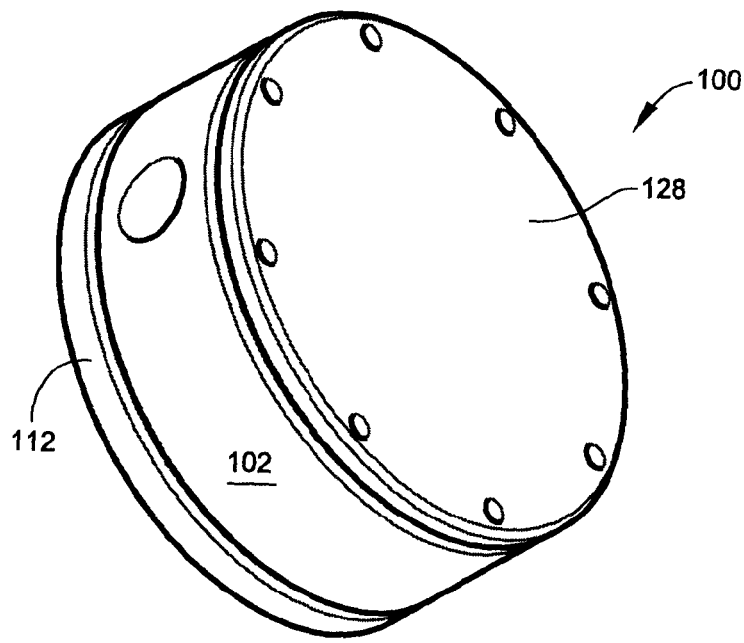
FIG. 6 is a bottom perspective view of a pressure regulating valve constructed according to an aspect of the invention.
Figure 7:
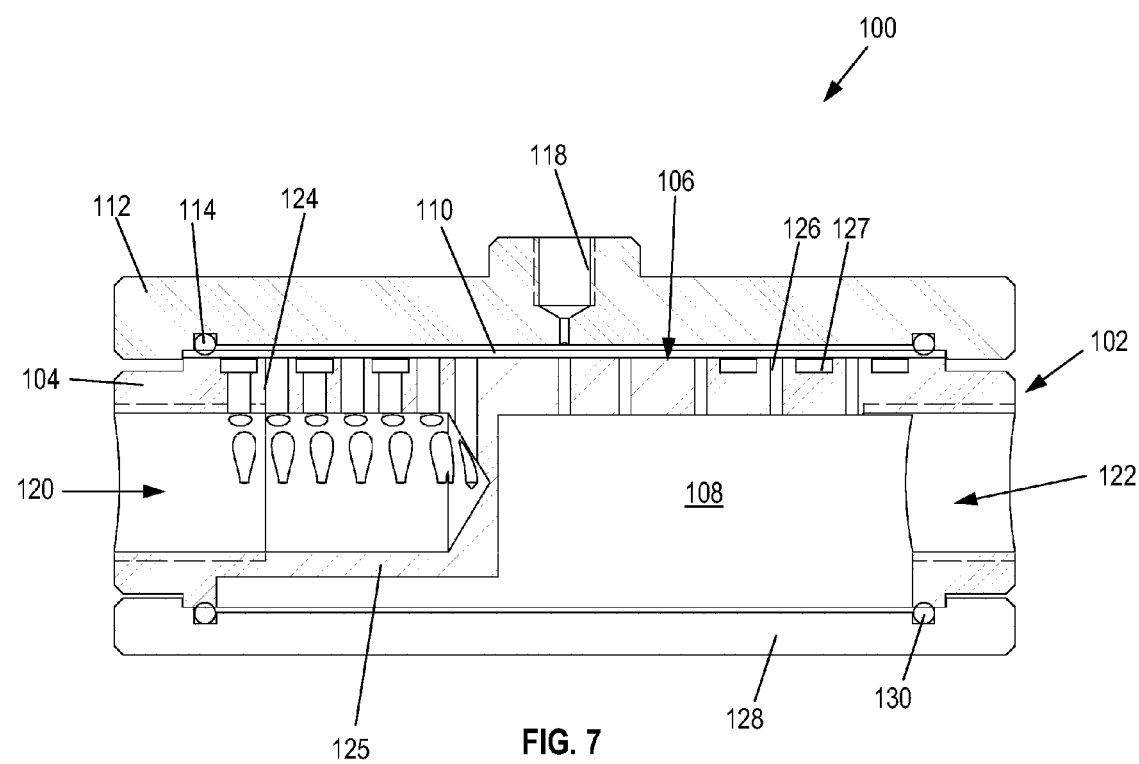
FIG. 7 is a cross-sectional view of the pressure regulating valve of FIG. 5.

Another variable in the performance of the valve is the location of the diaphragm's peripheral constraint relative to the gap between the process surface and the reference surface. Offset of the diaphragm constraint in the direction of the reference surface tends to bias the valve to relieve at lower, or even negative differential pressures, which can result in an unnecessary flow or waste of fluid. Good balanced performance, with negligible waste flow, can be achieved in the tested design by constraining the diaphragm directly along the process surface. The offset can be used to create a pressure bias. The modulated pressure relief valve can be configured utilizing shaped surfaces, such as concave or convex, on the diaphragm, process housing or both. Ribbing in the diaphragm, or process housing, can also be effectively utilized to alter the pressure bias between the process pressure and reference pressure at which venting occurs. If the modulated pressure relief valve is configured with an offset, for example, wherein the diaphragm is away from the process surface, for example, a positive pressure bias can be created wherein the modulated pressure relief valve vents at a process pressure which is lower than the reference pressure. This is also referred to in the art as an opening bias. FIG. 4 illustrates a valve having a slightly different process housing 4' which offsets the diaphragm 2 from the process housing 4' resulting in a gap "G" between the process housing 4' and the diaphragm 2. Alternatively, the modulated pressure relief valve can be configured such that a negative pressure bias is created wherein the process pressure must be higher than the reference pressure prior to venting. This would be referred to in the art as a closing bias.

The overall size of the diaphragm area ultimately determines the maximum possible relieving capacity. Increasing the overall size of the diaphragm area provides for greater potential relieving capacity, and can, when carefully combined with vent void size, spacing, and movement gap selection, offer greater pressure sensitivity at a given relieving capacity. A free diaphragm diameter of 2.9 inches is suitable for demonstration of the present invention.

The diaphragm's physical characteristics affect the relieving performance of the device. A reinforced elastomeric diaphragm, which is pliable to bending but is resistance to planar stretching, promotes higher sensitivities than un-reinforced diaphragms by increasing the effective size of the unsupported area around each vent void. In practice, a reinforced elastomeric diaphragm should be selected that is thin enough to be pliable, yet thick enough to withstand full system pressure stretched across the larger holes. Elastomeric stiffness, in Durometers, is not believed to be a critical factor for thin diaphragms. A 1/32" thick fabric reinforced rubber sheet with a typical or moderate hardness, such as a Shore A Durometer in 50-80 range, is particularly suitable for demonstration of the present invention.

The reference pressure source is a fluid source wherein the pressure of the fluid source can be accurately controlled. Particularly preferred fluids include gases. A particularly preferred gas comprises nitrogen with a most preferred fluid being air. Liquids can also be employed but are less desirable.

The separator is preferably a chamber which allows fluids to separate from liquids in a stream. Separators are commonly employed to remove moisture from air streams wherein the air stream originates from a compressed air source. It is not uncommon for moisture to be entrained with the air flow and a separator allows the moisture to separate from the air flow. A separator can also provide a reservoir which acts to absorb, or dampen, rapid changes in pressure without transmitting the rapid pressure change further down the process line. For example with water flow systems, an air reservoir may be employed to eliminate the phenomenon commonly referred to as "hammering" or "bumping" due to rapid changes in pressure.

The process system is any system commonly employed in manufacturing environments wherein the pressure must be maintained at or below an upper maximum. The present invention is suitable for use with fixed reaction kettles where the pressure in the reaction kettle must be monitored and with flow systems wherein the pressure build of flowing materials must be monitored.

It would be well within the ability of those with ordinary skill in the art to capture the material as it escapes from the vent voids or to redirect the material to a location of minimal concern.

FIGS. 5-10 illustrate a pressure regulating valve 100 constructed according to an alternative embodiment of the invention. The term "pressure regulating valve" is used here generically to refer to a device which is responsive to differential pressures applied thereto and which is capable of functioning as either a back pressure regulator or as a relief valve, depending on how it is arranged within a fluid system.

For purposes of explanation, it is noted that "back pressure regulator" and "relief valve" are two similar terms which describe the same functional device, though with different operational emphases. For relief valves, the emphasis is on the off/on flow interface, with expectations of zero flow through the device up to some predetermined set pressure, and maximum flow above the set pressure. For back pressure regulators, the emphasis is often on steady state flow control over a defined flow rate window, with less emphasis on the off/on flow threshold.

The pressure regulating valve 100 includes a body 102, which may be cast, machined, or built-up from separate components. The material of the body 102 is selected to suit a particular application based on requirements such as temperature, pressure, chemical compatibility, etc. Non-limiting examples of suitable materials which are chemical-resistant include 316 stainless steel, PVC, brass, and polytetrafluoroethylene (PTFE). The body 102 includes a wall 104 whose first side defines a process surface 106. An exhaust chamber 108 is formed in the body 102 and is bounded at least in part by the second side of the wall 104.

A membrane 110 (also referred to interchangeably herein as a diaphragm) is disposed adjacent the process surface 106. The membrane 100 has opposed sides referred to as reference and process sides, with the process side facing the process surface 106. The perimeter of the membrane 110 is secured against the body 102. In the illustrated example, the membrane 110 is secured to the body 102 by a relatively rigid reference housing 112 which may be attached to the body 102 by fasteners or clamps (not shown). Optionally, an additional seal such as the illustrated resilient O-ring 114 may be provided.

As shown, the process surface 106 is substantially coplanar with the plane of restraint of the membrane 110. However, optionally, the process surface 106 may be positioned slightly (e.g. up to about 2% of the free membrane diameter) above or below the plane of membrane constraint, in order to effect a slight closing or opening bias, respectively. Furthermore, rather than being wholly planar, the process surface 106 may incorporate a slight curvature or angled profile between its outer regions toward its center. The maximum deviation of the process surface 106 from the plane of membrane constraint should be less than about 2% of the free membrane diameter.

A reference port 118 is formed in the reference housing 112 and is disposed in fluid communication with the reference side of the membrane 110. Inlet and outlet ports 120 and 122 are also formed in the body 102. The central axes of these ports may be coplanar or substantially coplanar with each other, and the plane of these axes may be parallel with the membrane 110, as constrained between the body and the reference housing 112. These two ports may be diametrically opposed relative to the body 102 and co-axial with each other as well.

At least one process void 124 is disposed in fluid communication with the inlet port 120 and the process surface 106. In the illustrated example, a boss 125 which protrudes into the exhaust chamber 108 forms the flow path from the inlet port 120 to the process void 124. At least one vent void 126 is disposed in fluid communication with the outlet port 124 and the process surface 106. The function of the process void (or voids) 124 is to bring the process fluid into the process pressure regulating valve 100. The process void area does not have a critical impact on the function of the pressure regulating valve 100 so long as it is sized to be significantly larger than the total area of the vent voids 126, thereby not contributing significantly to the pressure drop through the pressure regulating valve 100.

Figure 8:
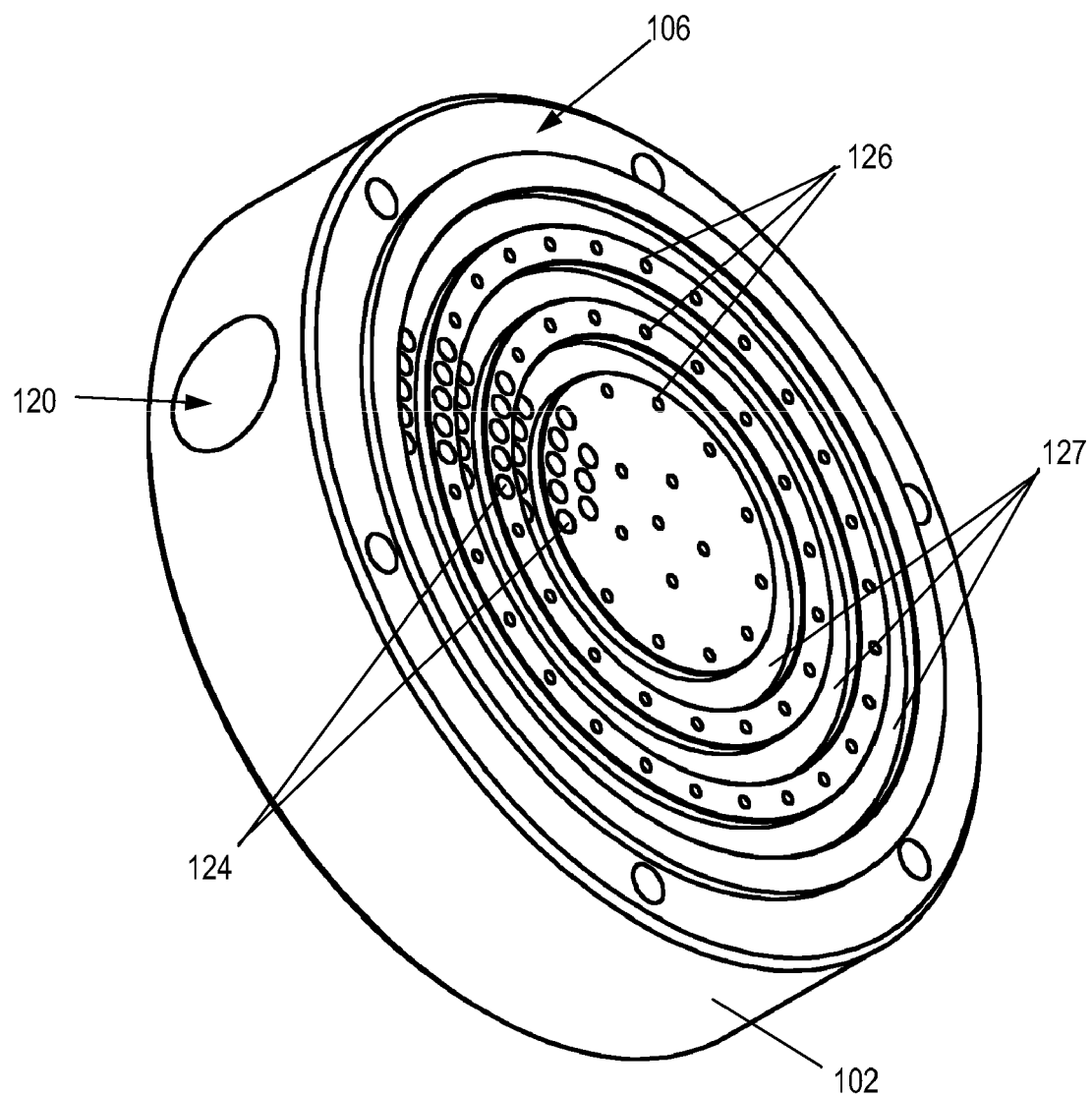
FIG. 8 is a top perspective view of the body of the pressure regulating valve of FIG. 5.
Figure 9:
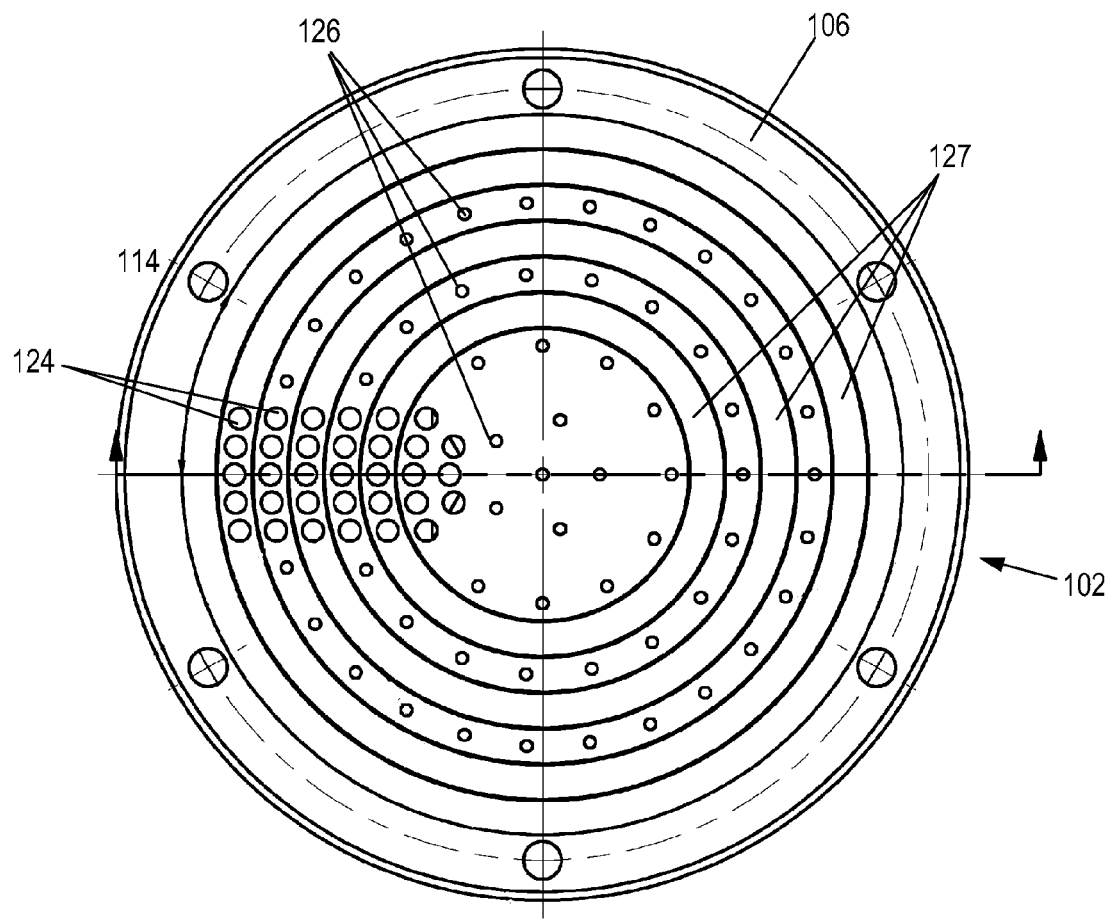
FIG. 9 is a top plan view of the body of the pressure regulating valve of FIG. 5.
Figure 10:
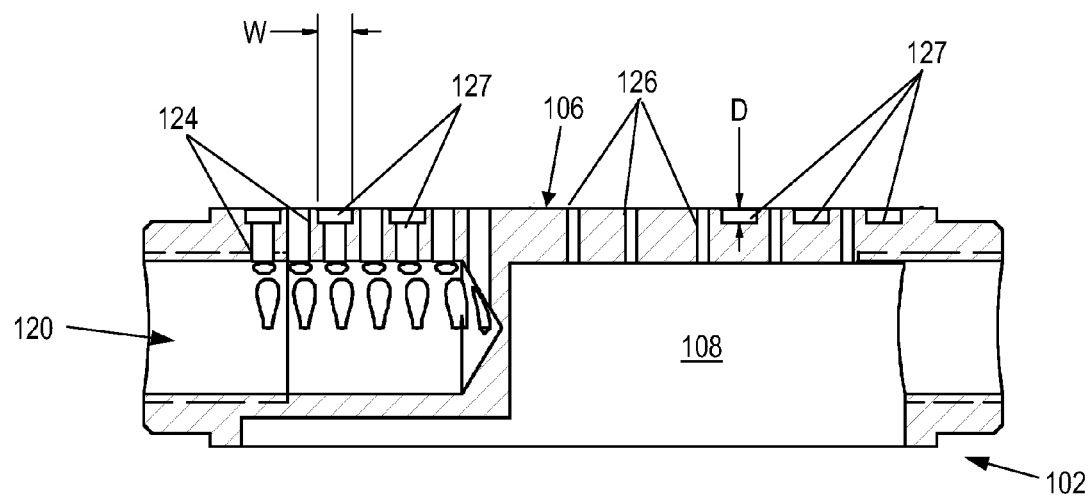
FIG. 10 is a cross-sectional view of the body of the pressure regulating valve of FIG. 5.
Figure 11:
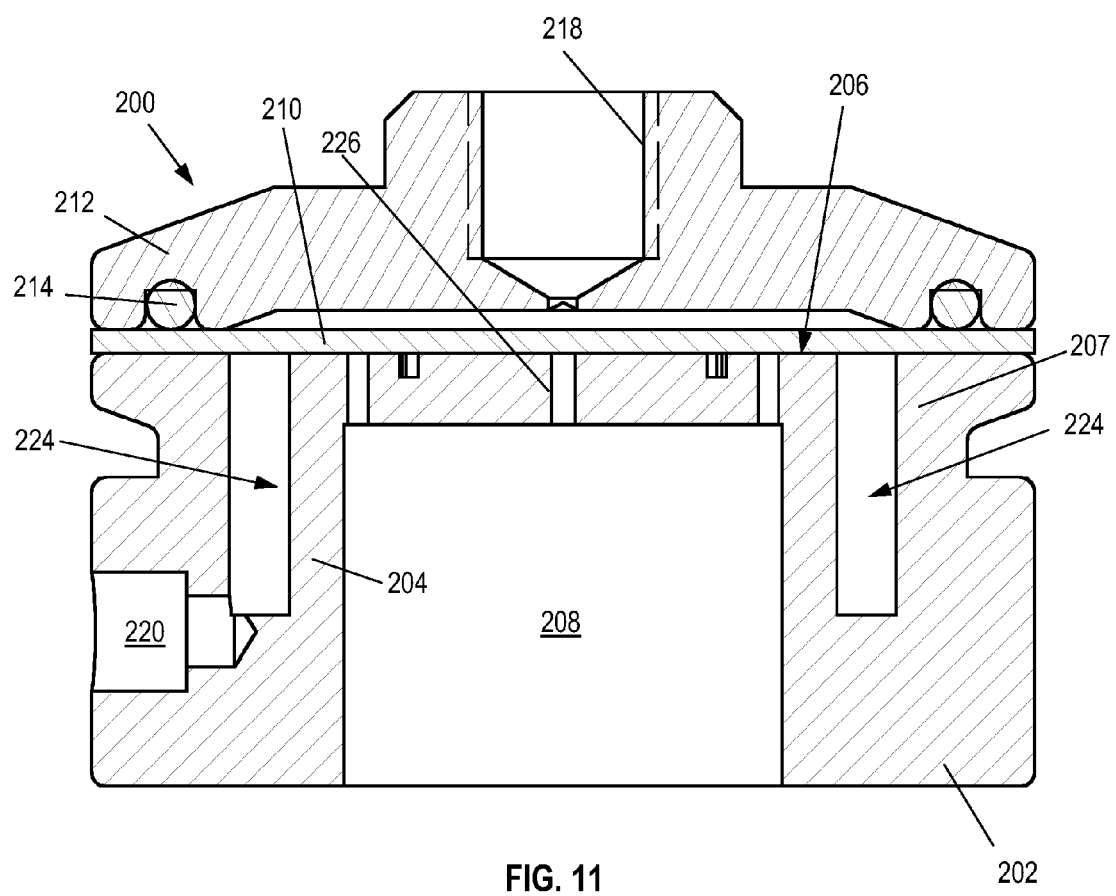
FIG. 11 is a first cross-sectional view of an alternative pressure regulating valve.
Figure 12:
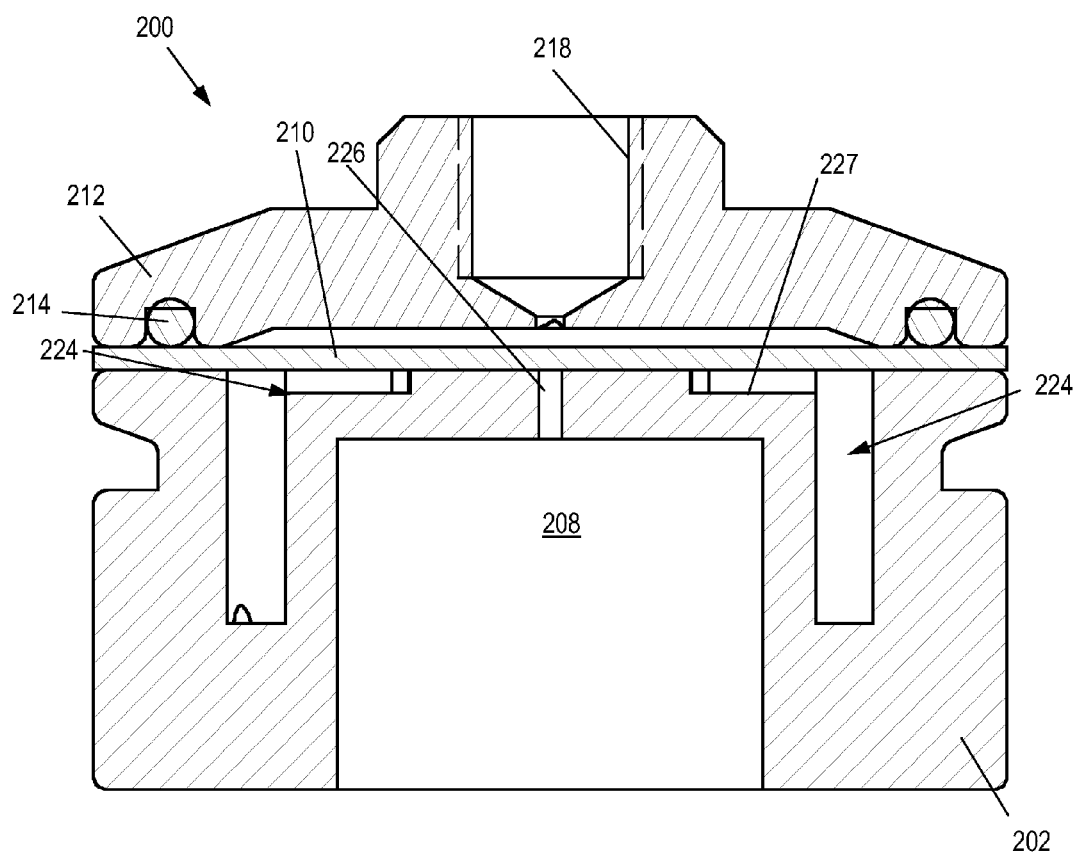
FIG. 12 is a second cross-sectional view of the pressure regulating valve of FIG. 11.
Figure 13:
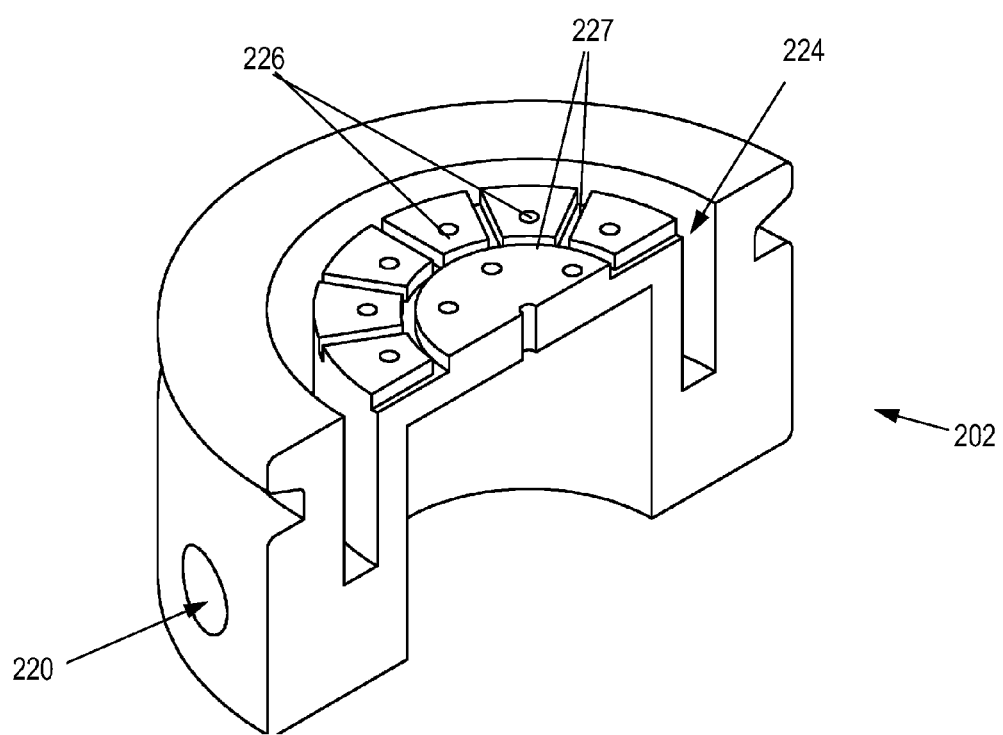
FIG. 13 is a perspective sectional view of a body of the pressure regulating valve of FIG. 11.
Figure 14:
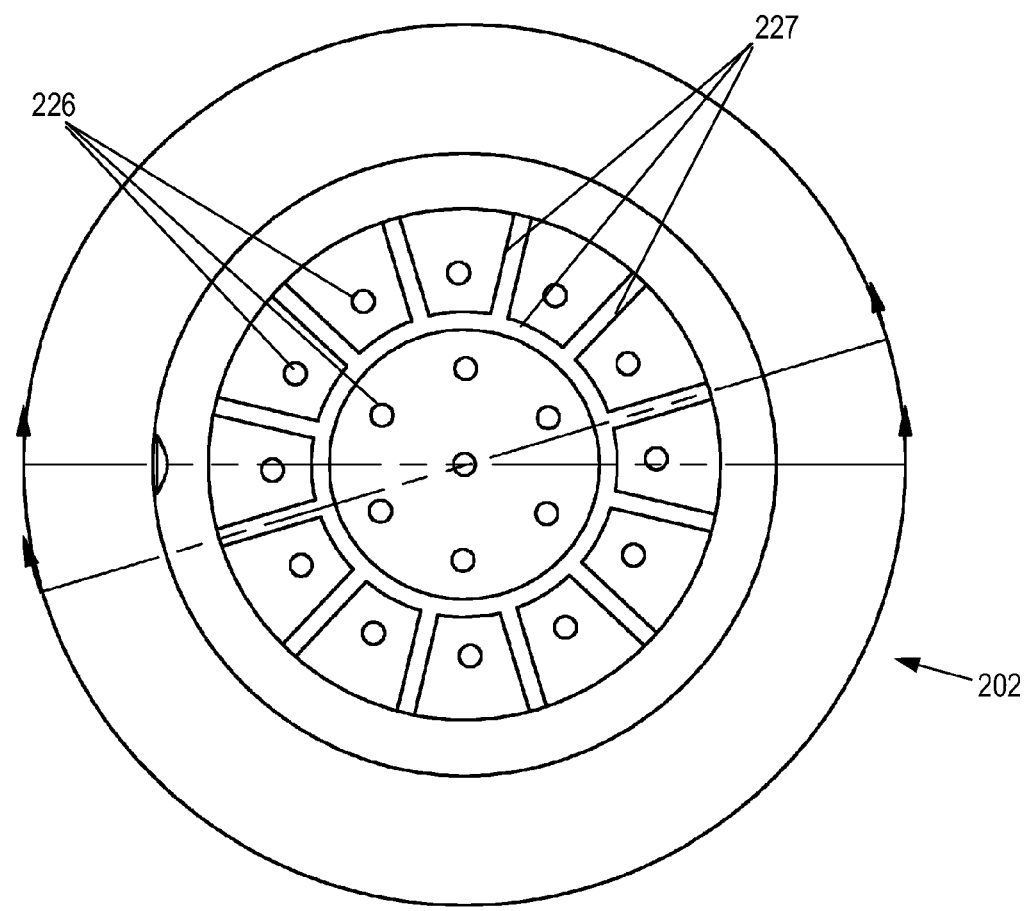
FIG. 14 is a top plan view of the body shown in FIG. 13.

However, for maximum efficiency, the total process void area 124 should be at least about 75% of the inner cross sectional area of the incoming conduit (not shown) that would be connected to the inlet port 120. More preferably, the process void area should be equal or greater than that of the incoming conduit area. As best seen in FIGS. 8 and 9, in this example, 33 process voids 124 of approximately 3.8 mm (0.15 in.) diameter yield a total process void area of about 3.7 $cm^2$ (0.58 $in.^2$), exceeding the incoming conduit area. In the specific example shown, the inlet port 120 is sized to accommodate an incoming conduit which is a ⅜" Schedule 40 pipe having an area of 0.53 $in.^2$. For many applications the process void 124 could be provided in a single large void, or a series of slots. However, multiple process voids 124, as shown here, are preferable where a delicate diaphragm is desired and where such diaphragm may be stressed at the maximum operating pressure by the large unsupported region of the diaphragm. A similar effect could be had by providing a single process void 124 and incorporating a grid or screen (not shown), or by machining or otherwise forming the process void 124 in such a way that supporting material is present inside the boundary of the process void 124 to reinforce the membrane 110.

The diameter and spacings of the vent voids 126 may be selected as described above with respect to the pressure relief valve 1. In the illustrated example, the vent voids 126 are of equal diameter and are generally arranged in concentric rings; however they may be disposed in a different pattern or may vary in diameter.

The process surface 106 incorporates grooves 127 which are effective to channel fluid from some or all of the process voids 124 to the vicinity of some or all of the vent voids 126 without disrupting the substantially coplanar relationship between the membrane constraint and the plane of the vent voids 126 (i.e. the process surface 106). To facilitate this channeling, a substantial number of the vent voids 126 are located in the near vicinity of a groove 127. As used herein, the term "near vicinity" means close enough so as to significantly reduce the pressure drop of the fluid as it moves through the area surrounding the vent voids between the process surface 106 and the membrane 110. For example, about one-third of the vent voids 126 may be located within about 5 vent void diameters of a groove 127. In the illustrated example, over 90% of the vent voids 126 are located within significantly less than 2 vent void diameters from a groove 127.

To further facilitate this channeling function, it is also helpful that a significant portion of the process void or voids 124, for example about ⅓ or more of the total process void area, is located within one of the grooves 127. In the illustrated example, about 40% of the process voids 124 are located within the grooves 127.

The grooves 127 may be configured in any pattern which is effective to channel fluid from the process voids 124 as described above. For the pressure regulating valve described a suitable configuration would be for the grooves 127 to be concentric with the body 102 so that they can be fabricated using a lathe or circular milling action. One or more of rings of the vent voids 126 may be separated by a groove 127. Process voids 124 can be positioned both in and between these grooves 127 in any efficient pattern. Optionally, the process voids 124 could be in the form of elongated slots, especially where located in the bottom of the grooves 127. For very low pressure applications, there may be only a single process void that is connected with these grooves 127.

In order to determine the required depth and width of the grooves 127, an important design parameter is the cross sectional area available for flow out of the process void 124 area below the process surface 106 (i.e. the plane of the vent voids). For example, as illustrated, 3 grooves having depth "D" of about 2.5 mm (0.1 in.) and width "W" of about 6.1 mm (0.24 in.) would provide 6 channels of area about 0.93 $cm^2$ (0.144 $in.^2$), where the free membrane diameter is approximately 6.4 cm (2.5 in.).

This additional flow area should be at least about 10% of the overall inner cross sectional area of the incoming conduit area. More preferably, the additional flow area from the grooves 127 should be at least about 75% of the inner cross section of the incoming conduit area. The 0.93 cm$^2$ (0.144 in$^2$) additional flow area is about 76% of the overall incoming conduit area, when the incoming conduit is a ⅜" NPT Schedule 40 pipe.

The groove depth D can be as deep as desired, though the groove width W should be limited based on the pressure of the application and the burst strength of the membrane 110. The greater the unsupported groove width, the greater the mechanical stresses on the membrane 110. Optionally, the grooves 127 may incorporate a small fillet or radius to minimize stress concentration on the membrane 110. Such edge treatments are highly recommended for higher pressure and/or pulsating applications.

The exhaust chamber 108 is closed off by a relatively rigid bottom cap 128 which is attached to the body 102, for example using fasteners or clamps (not shown). Optionally, an additional seal such as the illustrated O-ring 130.

The membrane 110 may be constructed from a material which is chemically inert and/or chemically resistant. One example of such a material is fiber reinforced PTFE sheeting. When combined with a chemically inert and/or chemically resistant body material as described above, the pressure regulating valve 100 is made fully compatible for aggressive chemical contact. Because the O-rings 114 and 130 (if used) are not wetted in this configuration, low-cost commercial rubber O-ring material may be used. For very low pressure applications, e.g. below about 0.2 kPa (4 psi), a thin film, for example, thermoplastic films in the range of about 0.012 mm (0.0005 in.) to 0.15 mm (0.006 in.) thick have been found to be especially well suited for use as membranes in low pressure applications. Polyolefin and PTFE film with thicknesses of about 0.051 mm (0.002 in.) to about 0.1 mm (0.004 in.) are the most preferred thermoplastic films. Also well suited for membranes in these low pressure applications is rubber sheeting with fabric reinforcement. A Buna N rubber sheeting with a thickness of substantially less than about 0.51 mm (0.02 in.), and preferably about 0.25 mm (0.01 in.), with nylon woven reinforcement, is highly suitable.

Figure 15:
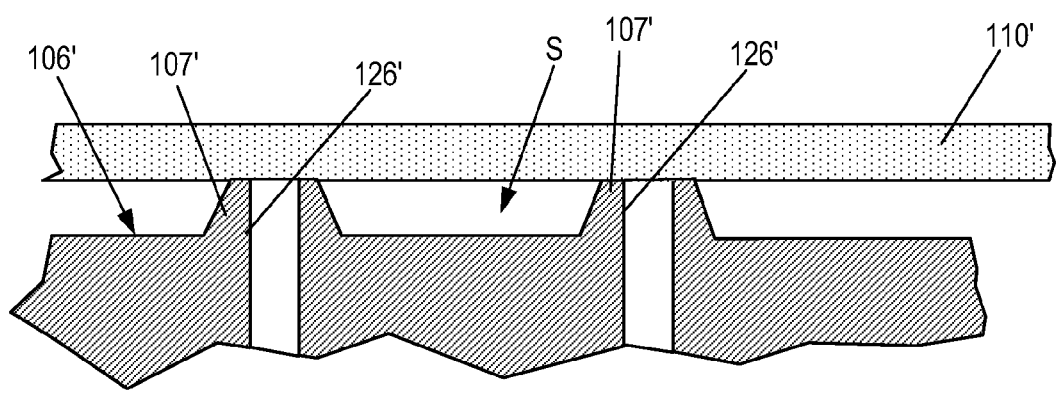
FIG. 15 is a cross-sectional view of a portion of a process surface of a pressure regulating valve.

For applications requiring a very tight shut-off at the vent voids, supple diaphragms in the Shore A elastomer range are preferable ((typical Buna or Viton) as discussed above). However, if a less supple or harder (Shore D) diaphragm is otherwise required a particularly tight shut-off is needed, it is possible to modify the vent void geometry to achieve the required tight shut-off. For these demanding applications, the flat process surface 106 may not be adequate to achieve a perfect seal, especially at low differential pressures. In this situation, the process surface surrounding one or more vent voids may be raised slightly (less than 2 vent void diameters) above the surrounding process surface to increase the concentration of sealing forces immediately surrounding said vent voids. FIG. 15 illustrates a portion of an alternative process surface 106' which incorporates these raised surfaces 107' around vent voids 126'. The region of raised surface should not exceed the circle diameter that is approximately 0.3 times the spacing between a vent void 126' and its nearest neighbor. The profile at the vent void lip may be abrupt or sharp for low pressure applications, but should be rounded or chamfered to avoid puncturing the membrane 110' for applications where the pressure exceeds about 50% of the burst pressure of the membrane 110' In this configuration, the vent void lip circle itself may be co-planar with the membrane constraint, or may rise slightly above the plane of membrane constraint (e.g. up to about 2% of the free membrane area). Using this configuration, the space "S" between the raised portions of the process surface 106' provides additional flow area under the membrane 110', thus eliminating the need for the grooved discussed above. Otherwise the construction of a pressure regulating valve using the process surface 106' would be the same as the pressure regulating valve 100.

The optimum diaphragm (membrane) movement gap is significantly less for the pressure regulator 100 utilizing the grooved design (or the raised surface design, FIG. 15) than would be for a flat process surface as described above. This is due to the increased cross sectional area for fluid transfer between the process and vent voids 124 and 126 inside the grooves 127, thereby alleviating the need for higher movement gaps. The optimum movement gap is different for different types of applications. Key variables are the viscosity of the fluid, the flow rate of the fluid, and the set-point pressure of the fluid. As these variables change, the optimum diaphragm movement gap changes.

An example of the advantage of a reduced diaphragm movement gap is that of an air pressure application using a back pressure regulator 100 as described above with a nominal 9.5 mm (⅜") diameter inlet. For air flow rates above about 10 scfm and set-point pressures above about 20 psi, a distinct chatter was observed with the regulator when large movement gaps are utilized. Such instabilities are also typical of regulators with flat process surfaces lacking the grooves 127. However, by reducing the diaphragm movement gap below about 1 vent void diameter, instability can be eliminated. Further testing and analysis confirms that for many applications the ideal diaphragm movement gap is about 0.5 vent void diameters or less. For very low pressures, a reduced diaphragm gap is not needed to prevent instability and a gap of about 1.5 mm (0.06 in.) may be used.

The operating principle of the pressure regulating valve 100 is substantially similar to that of the pressure relief valve 1 described above. During normal balanced or modulating mode the membrane 110 is drawn into a sealing relationship with the vent voids 126 due to the pressure differential between the vent pressure and reference pressure. When the vessel pressure exceeds the reference pressure the area of the membrane 110 between the vent voids 126 is persuaded away from the vent voids 126 thereby allowing venting. This motion, however, is limited by the reference pressure exerted on the inner surface of the reference housing 112. The membrane 110 is forced into an irregular pattern, with regions closely surrounding the vent voids 126 being unsupported by the process surface 106 of the main body 102, and therefore trying to pull the membrane 110 out of contact with the vent void 126. When the ratio of pressure differential ratio, which is defined as the differential Vessel-Reference divided by Reference-Vent, rises to the area ratio, which is defined by the unsupported membrane area divided by the area of the vent void 126, then that particular vent void 126 begins to crack open or modulate. As the vessel pressure further increases, more vent voids open. At higher differential pressures, such as several PSI, the entire hole pattern opens up to allow higher venting volume flow.

With the example relief valve using grooved geometry, the cracking over-pressure is typically in the range of 101 to 102% of reference pressure. This ratio corresponds very approximately to the ratio of vent void area to totally free diaphragm area (e.g. about 1% to 2%). The example valve had 24 vent voids of approximate diameter 1.8 mm (0.07 in.) with free diaphragm diameter of about 6.3 mm (2.48 in.), reduced diaphragm movement gap of 0.76 mm (0.030 in.), vent void area to free diaphragm area ratio of 1.9%, and approximate vent void spacing in the range of about 7.6 mm (0.3 in.) to about 1.0 mm (0.4 in.). Process voids were 26 each at about 2.5 mm (0.100 in.).

The functioning of the pressure regulating valve 100 is enhanced by the presence of the grooves 127. More specifically, the grooves 127 permit substantially unimpeded flow "underneath" the membrane 110 and thereby reduce the pressure losses that would otherwise be present in flow between the process voids 124 and the vent voids 126. In effect, this permits the vent voids 126 to operate in a "simultaneous parallel" manner, allowing substantial volume flow without sacrificing low-pressure accuracy all while maintaining the membrane constraint coplanar with the plane of the vent voids.

FIGS. 11-14 illustrate a pressure regulating valve 200 constructed according an alternative embodiment of the invention. The pressure regulating valve 200 includes a body 202, which may be cast, machined, or built-up from separate components. The material of the body 202 is selected to suit a particular application based on requirements such as temperature, pressure, chemical compatibility, etc. Examples of suitable chemical-resistant materials include 316 stainless steel and polytetrafluoroethylene (PTFE). The body 202 includes an upstanding cylindrical central chamber with a wall 204 whose first side defines a process surface 206. An exhaust chamber 208 is formed in the body 202 and is bounded at least in part by the second side of the wall 204. An outer wall 207 surrounds the central chamber.

At least one process port 220 is formed in the body 202. If two or more process ports 220 are provided, the longitudinal axes of these ports may be coplanar with each other. These two ports may be diametrically opposed relative to the body 202 and co-axial with each other as well. At least one process void 224 is disposed in fluid communication with the process port 220 and the process surface 206, and at least one vent void 226 is disposed in fluid communication with the exhaust chamber 208 and the process surface 206.

If desired, chamfering or rounding (not shown) of the vent and/or process void entrance surfaces may be used to prevent stress concentrations in the membrane (described below). Such enlargements tend to slightly increase the overall flow relieving capacity of the pressure regulating valve 200, while slightly decreasing its cracking pressure precision (by increasing the effective vent void cross sectional area). Chamfering is especially preferred for higher pressure applications (i.e. above 100 psi) and/or applications where severe pulsations exists.

The process void 224 is formed as a large annular ring surrounding the central chamber 203. The annular ring 224 allows fluid to flow unimpeded between the multiple process ports 220 (if present) while also allowing fluid to enter the process volume and flow through the vent voids 226 as necessary to control process pressure closely to the reference pressure. The process ports 220 may be threaded or they may be smooth depending on the type of connection used.

A membrane 210 having opposed reference and process sides 211 and 213 is disposed adjacent the process surface 206. The perimeter of the membrane 210 is secured against the body 202. In the illustrated example, the membrane 210 is secured to the body 202 by a relatively rigid reference housing 212 which may be attached to the body 202 by fasteners or clamps. A top surface of the outer wall 207 is used to constrain the membrane.

The process surface 206 incorporates a plurality of grooves 227 which are effective to channel fluid from some or all of the process voids 224 to the vicinity of some or all of the vent voids 226 without disrupting the substantially coplanar relationship between the membrane constraint and the plane of the vent voids 226 (i.e. the process surface 206). To facilitate this channeling, a substantial number of the vent voids 226 are located in the near vicinity of a groove 227. The proximity of the vent voids 226, process voids 224, and grooves 227 may be substantially as described above for the pressure regulating valve 100.

The grooves 227 may be configured in any pattern which is effective to shunt fluid from the annular process void 224 into the vicinity of the vent voids 226 as described above. Particular examples of suitable patterns which accomplish this function and which are also efficient to manufacture are a radial pattern, as most clearly shown in FIGS. 13 and 14, or a rectilinear groove pattern (not shown).

The operational principles of the pressure regulating valve 200 are substantially the same as those of the pressure relief valve 1 described above.

The precision obtainable by pressure regulating technology described above is largely dependent on the size, number, and spacing of the vent voids in relation to the overall area of the diaphragm or membrane. As an example, a 1.7 kPa (¼ psi) precision in a common industrial pressure regulating environment of 0 to 690 kPa (100 psi), or a mean pressure of 517 kPa (75 psi), could be described as 0.5%. However, many commercial applications, even those described as "precision" are easily satisfied by a precisions of 1%, 2%, or even 3%. In practical terms, the cracking pressure precision of a regulator is crudely approximated by the ratio of total vent void area divided by the free diaphragm or membrane area (especially where the size and spacing of the vent voids are as described above).

High flow precision, especially for liquids and most especially for viscous liquids, is governed more by the overall total cross sectional area of the vent voids and process voids. Therefore, proper design of the device for required precision is a balance between cracking pressure precision, (which is improved by increasing diaphragm or membrane area and limiting vent void area), and high flow precision, which is improved by principally by increasing total void area and maintaining adequate transverse flow area through the movement gap and/or grooves.

These principles hold even for control of extremely low pressures, giving the pressure regulating devices described above extraordinary precision in the pressure range below about 6.9 kPa (1 psi). Ultra low pressure control can be achieved by the connection of a static fluid head (preferably water) to the reference port as a convenient method of generating a stable reference pressure, or by the connection of an ultra low pressure mechanical or electro-pneumatic regulator. Practically speaking, these designs are highly suitable for use with reference pressures down to the range of about 0.01 psi. For a valve with 1% cracking pressure precision and a setpoint of 0.2 psi, the low flow (or cracking) precision of such a device would be expected to be approximately 0.002 psi.

Many commercial applications are more concerned with pressure stability across a specified flow range than they are with cracking pressure precision. By way of a non-limiting example, a pressure regulating device as described above with approximately 5.1 cm (2 in.) free diaphragm or membrane diameter with twelve 1.8 mm (0.07 in.) diameter vent voids can control from about 0 to about 50 ml/min. of air flow at about 6.9 kPa (1 psi) setpoint (reference pressure), with overpressure increasing only from about 0.069 kPa (0.01 psi) to about 0.48 kPa (0.07 psi) through the range. At about 13.8 kPa (2 psi) setpoint, the overpressure through the same flowrate range would increase only from about 0.01 kPa (0.015 psi) to about 0.62 kPa (0.09 psi). In each case, the pressure precision is better than about 2%. Such precision can also be maintained at very high pressures, e.g. several thousand psi.

Testing of the pressure regulating valve configuration described above shows that the grooved configuration gives significantly less low flow error or under-pressure (defined as inlet pressure minus reference pressure) as compared to the same valve without the grooves.

The foregoing has described a pressure regulating valve. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A pressure regulating valve comprising:
   (a) a body including:
      (i) a wall with a first side which defines a process surface, at least one process void disposed in the process surface and adapted to be disposed in fluid communication with a fluid at a process pressure, and at least two vent voids disposed in the wall separate from the at least one process void;
      (ii) an inlet port disposed in fluid communication with the at least one process void; and
      (iii) an outlet port disposed in fluid communication with the at least one vent void,
   (b) a reference housing adapted to be disposed in fluid communication with a fluid at a predetermined reference pressure; and
   (c) a membrane having opposed reference and process sides, the membrane constrained between the body and the reference housing such that the process side is substantially coplanar with the process surface, and arranged such that, when the reference pressure is higher than the process pressure the membrane is engaged with the vent voids, and when the process pressure is higher than the reference pressure, the membrane is not engaged with at least one of the vent voids;
   (d) wherein the process surface incorporates at least one groove therein which defines a flow path between the near vicinity of the at least one process void and the near vicinity of the vent voids, wherein a significant portion of the open area of the process void lies within the at least one groove.

2. The pressure regulating valve of claim 1 wherein the at least one process void lies within the at least one groove.

3. The pressure regulating valve of claim 1 wherein the process surface includes a plurality of substantially concentric annular grooves.

4. The pressure regulating valve of claim 1 wherein a central axis of the outlet port lies substantially in a single plane with a central axis of the inlet port.

5. The pressure regulating valve of claim 1 wherein the body and the reference housing define a gap limiting the movement of the membrane, the gap being no more than about 1.0 times a diameter of the vent void.

6. The pressure regulating valve of claim 5 wherein the body and the reference housing define a gap limiting the movement of the membrane, the gap being no more than about 0.5 times a diameter of the vent void.

7. The pressure regulating valve of claim 1 wherein a plane of constraint of the membrane is offset from the process surface.

8. A pressure regulating valve comprising:
   (a) a body including:
      (i) a wall with a first side which defines a process surface, at least one process void disposed in the process surface and adapted to be disposed in fluid communication with a fluid at a process pressure, and at least two vent voids disposed in the wall separate from the at least one process void;
      (ii) an inlet port disposed in fluid communication with the at least one process void; and
      (iii) an outlet port disposed in fluid communication with the at least one vent void,
   (b) a reference housing adapted to be disposed in fluid communication with a fluid at a predetermined reference pressure; and
   (c) a membrane having opposed reference and process sides, the membrane constrained between the body and the reference housing such that the process side is substantially coplanar with the process surface, and arranged such that, when the reference pressure is higher than the process pressure the membrane is engaged with the vent voids, and when the process pressure is higher than the reference pressure, the membrane is not engaged with at least one of the vent voids;
   (d) wherein the process surface incorporates at least one groove therein which defines a flow path between the near vicinity of the at least one process void and the near vicinity of the vent voids, wherein there are a plurality of process voids, and at least about 40% of the process voids lie within the at least one groove.

9. A pressure regulating valve comprising:
   (a) a body including:
      (i) a wall with a first side which defines a process surface, at least one process void disposed in the process surface and adapted to be disposed in fluid communication with a fluid at a process pressure, and at least two vent voids disposed in the wall separate from the at least one process void;
      (ii) an inlet port disposed in fluid communication with the at least one process void; and
      (iii) an outlet port disposed in fluid communication with the at least one vent void,
   (b) a reference housing adapted to be disposed in fluid communication with a fluid at a predetermined reference pressure; and
   (c) a membrane having opposed reference and process sides, the membrane constrained between the body and the reference housing such that the process side is substantially coplanar with the process surface, and arranged such that, when the reference pressure is higher than the process pressure the membrane is engaged with the vent voids, and when the process pressure is higher than the reference pressure, the membrane is not engaged with at least one of the vent voids;
   (d) wherein the process surface incorporates at least one groove therein which defines a flow path between the near vicinity of the at least one process void and the near vicinity of the vent voids, wherein a substantial portion of the vent voids are located within about 5 vent void diameters of the at least one groove.

10. The pressure regulating valve of claim 9 wherein a substantial portion of the vent voids are located less than about 2 vent void diameters from the at least one groove.

11. A pressure regulating valve comprising:
    (a) a body including:
       (i) a wall with a first side which defines a process surface, a plurality of process voids disposed in the process surface and adapted to be disposed in fluid communication with a fluid at a process pressure, and a plurality of vent voids disposed in the wall separate from the process voids, the process voids having a combined cross sectional area greater than a combined cross sectional area of all of the vent voids;
  (ii) an inlet port disposed in fluid communication with the process voids; and
  (iii) an outlet port disposed in fluid communication with the vent voids,
(b) a reference housing adapted to be disposed in fluid communication with a fluid at a predetermined reference pressure; and
(c) a membrane having opposed reference and process sides, the membrane constrained between the body and the reference housing such that the process side is substantially coplanar with the process surface, and arranged such that, when the reference pressure is higher than the process pressure the membrane is engaged with the vent voids, and when the process pressure is higher than the reference pressure, the membrane is not engaged with at least one of the vent voids;
(d) wherein the process surface incorporates at least one groove therein which defines a flow path between the near vicinity of the process voids and the near vicinity of the vent voids.

12. The pressure regulating valve of claim 11 wherein the membrane is a thermoplastic film having a thickness of about in the range of 0.0005 in. to about 0.006 in.

\* \* \* \* \*